United States Patent
Pahud et al.

(10) Patent No.: US 10,976,819 B2
(45) Date of Patent: Apr. 13, 2021

(54) HAPTIC FEEDBACK FOR NON-TOUCH SURFACE INTERACTION

(71) Applicant: Microsoft Technology Licensing, LLC, Redmond, WA (US)

(72) Inventors: Michel Pahud, Kirkland, WA (US); Johnson T. Apacible, Mercer Island, WA (US); Sasa Junuzovic, Kirkland, WA (US); David W. Brown, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 14/981,719

(22) Filed: Dec. 28, 2015

(65) Prior Publication Data

US 2017/0185151 A1 Jun. 29, 2017

(51) Int. Cl.
*G06F 3/0484* (2013.01)
*G06F 3/01* (2006.01)
*G06F 3/0481* (2013.01)

(52) U.S. Cl.
CPC .............. *G06F 3/016* (2013.01); *G06F 3/011* (2013.01); *G06F 3/04815* (2013.01); *G06F 3/04842* (2013.01); *G06F 2203/04101* (2013.01)

(58) Field of Classification Search
CPC ...... G06F 3/016; G06F 3/011; G06F 3/04842; G06F 3/04815; G06F 2203/04101; G06F 3/0484

See application file for complete search history.

(56) References Cited

U.S. PATENT DOCUMENTS 4,885,565 A  12/1989  Embach
6,747,631 B1  6/2004  Sakamaki et al.
(Continued)

FOREIGN PATENT DOCUMENTS

CN  101621566 A  1/2010
CN  103250203 A  8/2013
(Continued)

OTHER PUBLICATIONS

"International Search Report and Written Opinion Issued in PCT Application No. PCT/US2016/067640", dated Aug. 4, 2017, 22 Pages.
(Continued)

*Primary Examiner* — Jeff Piziali
(74) *Attorney, Agent, or Firm* — Schwegman Lundberg & Woessner, P.A.

(57) ABSTRACT

In some examples, a system senses the location of a stylus or finger of a user relative to a virtual displayed object to determine when a virtual touch occurs. Upon or after such a determination, the system may generate a haptic action that indicates to the user that the virtual touch occurred. The haptic action may be located on a particular portion of a haptic device, which may be a handheld device. The particular portion may correspond to the location where the virtual displayed object was virtually touched. In this way, the user may receive physical feedback associated with the virtual touch of the virtual displayed object. In some examples, the virtual displayed object may change in response to the virtual touch, thus further providing visual and physical feedback associated with the virtual touch of the virtual displayed object to the user.

11 Claims, 8 Drawing Sheets

(56) References Cited

U.S. PATENT DOCUMENTS

| | | | |
|---|---|---|---|
| 7,225,404 | B1 | 5/2007 | Zilles et al. |
| 8,009,022 | B2 | 8/2011 | Kipman et al. |
| 8,249,263 | B2 | 8/2012 | Cragun |
| 8,344,861 | B2 | 1/2013 | Cragun |
| 8,487,873 | B2 | 7/2013 | Rosenberg |
| 8,493,188 | B2 | 7/2013 | Cragun |
| 8,526,677 | B1 | 9/2013 | Crichton et al. |
| 8,788,253 | B2 | 7/2014 | Rosenberg |
| 8,956,230 | B2 | 2/2015 | Adhikari |
| 9,024,874 | B2 | 5/2015 | Stetten et al. |
| 9,025,823 | B2 | 5/2015 | Tsin et al. |
| 9,111,424 | B2 | 8/2015 | Lim et al. |
| 2002/0149561 | A1* | 10/2002 | Fukumoto .......... G01C 21/3664 345/156 |
| 2008/0226134 | A1* | 9/2008 | Stetten ............... G06F 3/014 382/114 |
| 2009/0172606 | A1 | 7/2009 | Dunn et al. |
| 2009/0322497 | A1* | 12/2009 | Ku .................. G06F 1/1624 340/407.2 |
| 2010/0053151 | A1 | 3/2010 | Marti et al. |
| 2010/0097198 | A1* | 4/2010 | Suzuki .............. G06F 3/016 340/407.2 |
| 2010/0141411 | A1* | 6/2010 | Ahn .................. G06F 3/016 340/407.2 |
| 2011/0267318 | A1* | 11/2011 | Knee ................ G06F 3/016 345/179 |
| 2012/0113223 | A1 | 5/2012 | Hilliges et al. |
| 2012/0154132 | A1 | 6/2012 | Lee et al. |
| 2012/0242793 | A1 | 9/2012 | Im et al. |
| 2012/0249474 | A1* | 10/2012 | Pratt ................ G06F 1/1694 345/174 |
| 2012/0268369 | A1 | 10/2012 | Kikkeri |
| 2012/0268412 | A1* | 10/2012 | Cruz-Hernandez ........................ G06F 3/0488 345/174 |
| 2012/0293464 | A1* | 11/2012 | Adhikari ............ G06F 3/0354 345/179 |
| 2013/0044049 | A1* | 2/2013 | Biggs ............... G06F 3/016 345/156 |
| 2013/0100008 | A1 | 4/2013 | Marti et al. |
| 2013/0321356 | A1 | 12/2013 | Al-Sharif et al. |
| 2014/0210799 | A1 | 7/2014 | Kalaldeh et al. |
| 2014/0282274 | A1 | 9/2014 | Everitt et al. |
| 2014/0347298 | A1* | 11/2014 | Park ................. G06F 3/016 345/173 |
| 2015/0227203 | A1 | 8/2015 | Chen et al. |

FOREIGN PATENT DOCUMENTS

| | | |
|---|---|---|
| CN | 104685444 A | 6/2015 |
| EP | 2624238 A1 | 8/2013 |
| EP | 2853986 | 4/2015 |
| JP | 2013012150 A | 1/2013 |
| WO | WO2013077883 | 5/2013 |
| WO | WO2013101221 | 7/2013 |
| WO | WO2015102484 A1 | 7/2015 |
| WO | WO2015134391 A1 | 9/2015 |

OTHER PUBLICATIONS

Agrawal, et al., "Using Mobile Phones to Write in Air", In Proceedings of the 9th international conference on Mobile systems, applications, and services, Jun. 28, 2011, pp. 1-14.

Butler, et al., "SideSight: multi-"touch" interaction around small devices", In Proceedings of the 21st annual ACM symposium on User interface software and technology, Oct. 19, 2008, pp. 201-204.

Deselaers, et al., "GyroPen: Gyroscopes for Pen-Input with Mobile Phones", In Proceedings of IEEE Transactions on Human-Machine Systems, vol. 45, No. 2, Apr. 2015, pp. 263-271.

Gupta, et al., "SoundWave: Using the Doppler Effect to Sense Gestures", In Proceedings of the SIGCHI Conference on Human Factors in Computing Systems, May 5, 2012, 4 pages.

Hilliges, et al., "Interactions in the air: adding further depth to interactive tabletops", In Proceedings of the 22nd Annual ACM Symposium on User Interface Software and Technology, Oct. 4, 2009, pp. 139-148.

Hurst, et al., "Gesture-based interaction via finger tracking for mobile augmented reality", In Journal of Multimedia Tools and Applications, vol. 62, Iss. 1, Jan. 18, 2012, 26 pages.

Hurst, et al., "Tracking-based Interaction for Object Creation in Mobile Augmented Reality", In Proceedings of the 21st ACM international conference on Multimedia, Oct. 21, 2013, pp. 93-101.

Kim, et al., "RetroDepth: 3D silhouette sensing for high-precision input on and above physical surfaces", In Proceedings of the SIGCHI Conference on Human Factors in Computing Systems, Apr. 26, 2014, pp. 1377-1386.

Kron, et al., "Multi-Fingered Tactile Feedback from Virtual and Remote Environments", in the Proceedings of the 11th Symposium on Haptic Interfaces for Virtual Environment and Teleoperator Systems, Mar. 22, 2003, 8 pages.

Liu, et al., "Interactive Space: A Prototyping Framework for Touch and Gesture On and Above the Desktop", In Proceedings of Extended Abstracts on Human Factors in Computing Systems, Apr. 27, 2013, pp. 1233-1238.

Munch et al., "Intelligent Control for Haptic Displays", in the Proceedings of Computer Graphics Forum, vol. 15, No. 3, 1996, 10 pages.

Prisacariu, et al., "Real-Time 3D Tracking and Reconstruction on Mobile Phones", In Proceedings of IEEE Transactions on Visualization and Computer Graphics, vol. 21, Iss. 5, May 2015, pp. 557-570.

Rekimoto, Jun, "Traxion: A Tactile Interaction Device with Virtual Force Sensation", In Proceedings of the 26th annual ACM symposium on User interface software and technology, Oct. 8, 2013, pp. 427-431.

Robison, "Mobile Keyboard Projects On Any Surface & Fits on a Keychain [Future of Work]", available at: <<http://www.psfk.com/2013/02/ctx-keyboard.html>>, Feb. 3, 2012, 5 pages.

VisiHow, "Activate and Use Air Gestures on Samsung Galaxy Note 3", retrieved on: Sep. 18, 2015, available at: <<http://visihow.com/Activate_and_Use_Air_Gestures_on_Samsung_Galaxy_Note_3>>, 8 pages.

Wang, et al., "Bare finger 3D air-touch system with embedded multiwavelength optical sensor arrays for mobile 3D displays", In Journal of the Society for Information Display, vol. 21, Iss. 9, Sep. 2013, pp. 381-388.

Woollaston, "The pen just got SMART: Phree lets you make calls, shows mobile notifications and lets you write notes on ANY surface for them to appear on your phone", available at: <<http://www.dailymail.co.uk/sciencetech/article-3079833/The-pen-just-got-SMART-Phree-lets-make-calls-shows-mobile-notifications-lets-write-notes-surface-appear-phone.html>>, May 13, 2015, 17 pages.

The PCT Search Report and Written Opinion dated Mar. 20, 2017 for PCT applciation No. PCT/US2016/068167, 14 pages.

"Office Action Issued in European Patent Application No. 16823453.2", dated Aug. 28, 2019, 7 Pages.

"First Office Action and Search Report Issued in Chinese Patent Application No. 201680077023.X", dated Aug. 18, 2020, 16 Pages.

Ackerman, Evan, "New Haptic Tech Promises Feeling and Texture for Touchscreens and Gestures", [online], IEEE Spectrum. Retrieved from the Internet: <URL: https://spectrum.ieee.org/tech-talk/consumer-electronics/ gadgets/new-haptic-tech-brings-feeling-and-texture-to-touchscreens-and-beyond>, (2013), 3 pgs.

Samra, Roopkaninal, "Tactile Haptics: A Study of Roughness Perception in Virtual Environments", Thesis, University of Waterloo, Ontario, Canada, (2009), 143 pgs.

* cited by examiner

HAPTIC FEEDBACK FOR NON-TOUCH SURFACE INTERACTION

BACKGROUND

The popularity of smartphones, tablets, and many types of information appliances is driving demand and acceptance of touchscreens and other displays for portable and functional electronics. Touchscreens and other displays are found, among other places, in the medical field and in heavy industry, as well as in automated teller machines (ATMs), and kiosks such as museum displays or room automation, where keyboard and mouse systems do not allow a suitably intuitive, rapid, or accurate interaction by the user with the display's content.

SUMMARY

This application describes user interaction with one or more virtual displayed element(s). Because there is no physical contact when a user "touches" a virtual displayed element, the user cannot sense when such a virtual touch occurs. In some examples, a system senses the location of a stylus or finger of a user relative to a virtual displayed element to determine when a virtual touch occurs. Upon or after such a determination, the system may generate a haptic action that indicates to the user that the virtual touch occurred. The haptic action may be located on a particular portion of a haptic device, which may be a handheld device. The particular portion may correspond to the location where the virtual displayed element was virtually touched. In this way, the user may receive physical feedback associated with the virtual touch of the virtual displayed element. In some examples, the virtual displayed element may change in response to the virtual touch, thus further providing visual feedback associated with the virtual touch of the virtual displayed element to the user.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Rather than using a mouse, touchpad, or any other intermediate device, some display devices may enable a user to interact directly with display content (e.g., windows, menus, text, drawings, icons, images, and so on) that are displayed. In some examples, a display device may comprise a touchscreen that can sense and locate physical touch of an object (e.g., finger(s), stylus(es), and so on) on the display of the display device. In other examples, a device, which need not be a display, may be configured to sense an object (e.g., finger(s), stylus(es), and so on) without physical contact of a surface. For example, such a device may sense a finger in a portion of space "occupied" by a virtual display element, which may be produced by a virtual reality system.

Generally, a sense of touch enables persons to physically manipulate objects smoothly, rapidly, and accurately. Touch is used extensively during physical interaction with objects. Touchscreens provide such an interaction for manipulating elements displayed by the touchscreen. Virtual display elements, however, do not include a physical or real surface that allows for physical touch. Thus, it may be challenging for a person to manipulate or interact with such virtual elements smoothly sans a sense of touch.

In various examples, a three-dimensional (3D) display element may be rendered to virtually occupy a portion of real space. This situation is herein referred to as "space occupied by a display element." A 3D display element may comprise a product of a virtual reality (VR) system or an augmented reality (AR) system, and/or a display able to create 3D images without requiring the user to wear 3D glasses, where a user sees the 3D display element even though the 3D display element is a virtual display element that does not physically exist. Thus, the user may perceive to touch such a virtual display element, an action that is herein called a "virtual touch", although no physical touch occurs. Herein, a "virtual display element" may be used to describe either a 2D or a 3D display element.

In the case where a physical touch on a surface (e.g., a touchscreen display surface) occurs, detection of the touch is generally straightforward. Moreover, a user (e.g., a person performing the touch) may receive instant feedback that such a touch occurred because the user can feel the touch surface. In the case where a virtual touch occurs, however, detection of the touch is generally less straightforward. Moreover, the user may require a system, such as those described herein, to provide information to the user that the user has virtually touched a virtual display element.

In some examples, a system may be configured to sense one or more stylus(es)/pen(s), one or more fingers, one or more hands, and/or other body parts and/or objects that are not in physical contact with a real surface. In other words, physical contact with a display or other surface is not involved. Hereinafter, one or more stylus(es)/pen(s), one or more glove(s), one or more fingers, one or more hands or other body part(s) or object(s) is hereinafter called an object (e.g., "object" in this context is a catch-all phrase that includes anything that may interact with a portion of space that is apart from a physical surface).

In some examples, the term "hover," (sometimes called "3D touch") is used to describe a condition where an object is positioned in front of, but not in physical contact with, the front surface of a display or other type of surface. Accordingly, a hovering object may be defined as an object positioned in front of the display of a computing device, but without actually contacting the front surface of the display. Such an object, however, may interact with a virtual displayed element occupying a virtual space above the front surface of the display.

A display (e.g., touch-sensitive and/or hover-sensing) may be used in devices such as game consoles, personal computers, tablet computers, smartphones, and so on. A display may be attached to a computer(s) or used as a client device (e.g., as terminals) for networks. A display may be integrated in the design of digital appliances such as personal digital assistants (PDAs), global positioning system (GPS) navigation devices, mobile phones, video games, electronic books (E-books), and so on.

Various examples describe techniques and architectures for a system enabled to (among other things) detect and locate an object with respect to space occupied by a 3D display element. For example, a system associated with a display may determine the location of an object in a 3D orthogonal coordinate system (e.g., X, Y, and Z axes) relative to the 3D display element. In other examples, the system may be enabled to (among other things) detect and locate an object with respect to space occupied by a 2D display element. For example, such a 2D display element displayed on a screen may comprise associated depth information that defines a virtual distance that the 2D display element extends outward from the screen. In still other examples, a system may determine the locations of an object relative to a 2D or 3D display element at more than one time, and thus be able to determine speed or velocity of the object relative to a 2D or 3D display element.

In various configurations, a "system" may be considered to include any combination of things. For example, in some configurations, a system may be considered to be a display and a processor. In other examples, a system may include memory, an image processor module, a display, and a haptic device, as described below. In still other examples, a system may include a projector, goggles, headset, contact lenses, and so on. Claimed subject matter is not limited in this respect.

In some example configurations, actions of the system may be based, at least in part, on the determination of location or speed/velocity or orientation of one or more object(s). For example, the system may predict or determine a virtual touch (e.g., timing and/or location thereof) by the object of a virtual display element (e.g., 2D or 3D). The system may resultantly modify appearance of at least one virtual display element displayed by a display (e.g., any display of the system, including a display other than a display over which the object may be located) in response to such a prediction and/or location. Herein, the phrase "modify appearance of at least one virtual display element" refers to a display changing what (e.g., windows, menus, icons, graphical objects, text, and so on) or how (e.g., brightness and/or contrast of particular portions of the touchscreen) the display displays the element(s) or display background, though claimed subject matter is not limited in this respect. Herein, a display may include any of a number of types of displays including a pixelated LCD display, touchscreen, a projector, goggles, a headset, contact lenses, and so on. In some examples, a system may modify behavior of a user interface associated with the display using information regarding the location of the object(s) relative to a virtual display element. Such behavior that may be modified includes, program execution (e.g., shifting execution from one set of codes to another set of codes (sub-routines), displaying elements (as mentioned above), and generating haptic output (e.g., to an element in contact with a user of virtual reality), just to name a few examples.

In some examples, one or more virtual display elements may be observable by a user to be floating over a display, and in such cases haptic feedback may be felt only when the virtual display element(s) is pushed so as to touch the display.

Some example implementations may sense and locate objects using any of a number of techniques, such as capacitive sensing, image processing of images captured by one or more cameras, one or more depth cameras, use of a pointing device, wand, and/or controller, and so on.

In some example configurations, two virtual objects associated with two different displays, for example, may result in a system producing haptic feedback. For a particular example, a first display (e.g., of a smartphone) may display a virtual object having depth, as explained by examples herein. A second display (e.g., of another smartphone) may display a second virtual object having depth. If the two displays (e.g., the two smartphones) are moved to be relatively close to one another, such that the depths of each virtual object overlap, then a system may produce haptic feedback, visual feedback, and/or may modify execution of code based on the relative motion or positions of the two displays.

Various examples are described further with reference to FIGS. 1-12.

The environment described below constitutes one example and is not intended to limit the claims to any one particular operating environment. Other environments may be used without departing from the spirit and scope of the claimed subject matter.

In examples herein, though an element, such as a hover object, finger, camera, processor, and so on, may be stated in the singular, claimed subject matter is not so limited. Thus for example, unless otherwise stated, more than one of such elements may be implied.

Figure 1:
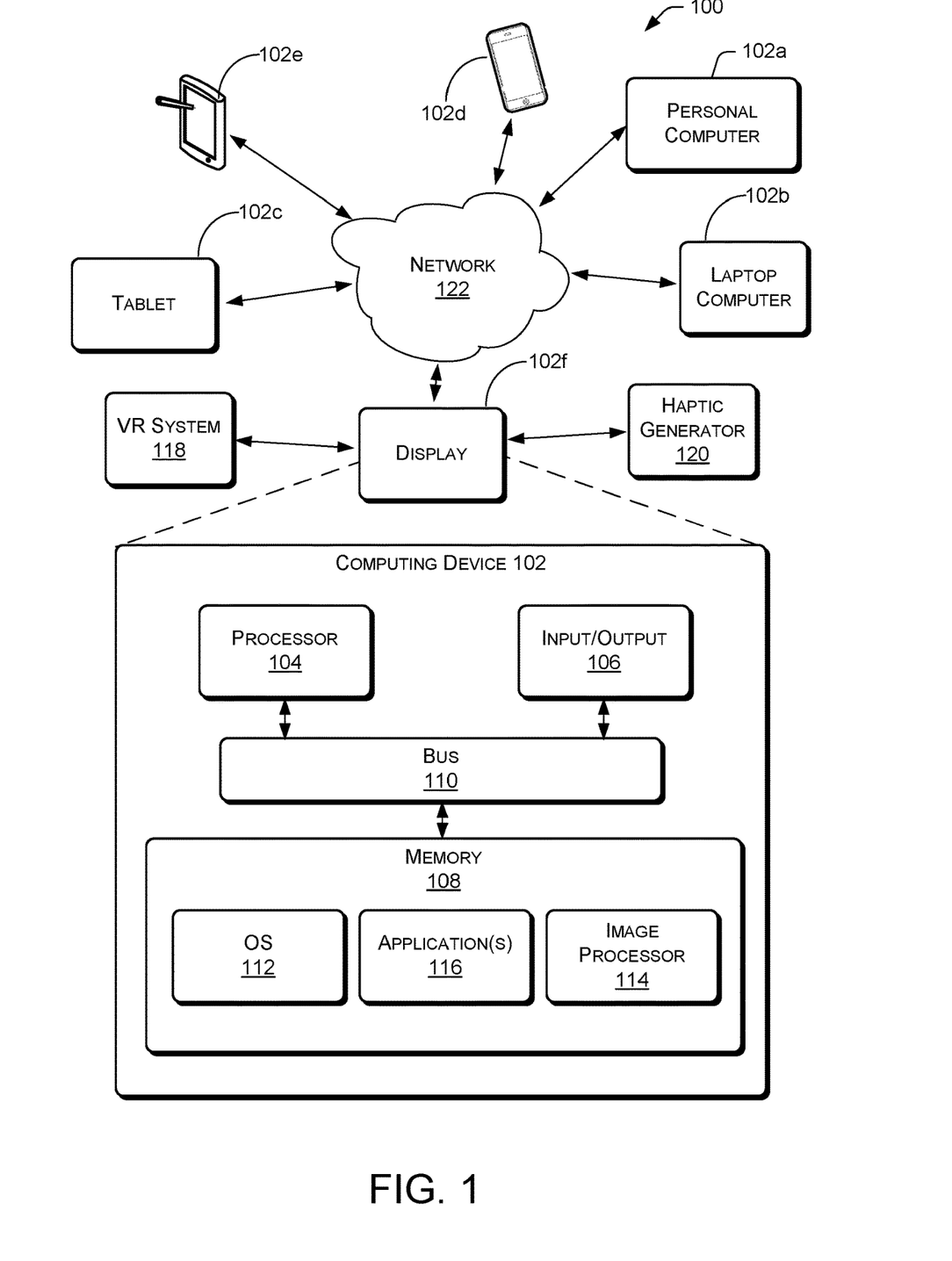
FIG. 1 is a block diagram depicting an example environment in which techniques described herein may be implemented.

FIG. 1 illustrates an example environment 100 in which example processes as described herein can operate. In some examples, the various devices and/or components of environment 100 include a variety of computing devices 102. By way of example and not limitation, computing devices 102 may include devices 102a-102f. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, a display 102f, electronic book readers, wearable computers, automotive computers, gaming devices, measurement devices, televisions, set top boxes, goggles, headgear (e.g., head-mounted displays), etc. Computing devices 102 can also include business or retail oriented devices such as, for example, server computers, thin clients, terminals, and/or work stations. In some examples, computing devices 102 can include, for example, components for integration in a computing device, appliances, or other sorts of devices.

Herein, unless specifically noted to the contrary, "processor" may include one or more processors. Processor 104, for example, may be used to operate display 102f For example, processor 104 may execute code to allow display 102f to display objects generated by any of a number of applications, which may also be executed by processor 104. Memory 108, which may be local (e.g., hard-wired in packaging of display 102f and processor 104) or remote (e.g., in a wired or wireless computer network), accessible to processor 104 may store such executable code or applications.

In some examples, some or all of the functionality described as being performed by computing devices 102 may be implemented by one or more remote peer computing devices, a remote server or servers, or a cloud computing resource.

In some examples, as shown regarding display 102f, memory 108 can store instructions executable by the processor 104 including an operating system (OS) 112, an image processor 114, and programs or applications 116 that are loadable and executable by processor 104. The one or more processors 104 may include one or more central processing units (CPUs), graphics processing units (GPUs), video buffer processors, and so on. In some implementations, image processor 114 comprises executable code stored in memory 108 and is executable by processor 104 to collect information, locally or remotely by computing device 102, via input/output 106. The information may be associated with one or more of applications 116. Image processor 114 may selectively apply any of a number of examples of colors, optical textures, images, and patterns, just to name a few examples, stored in memory 108 to apply to input data (e.g., captured images). For example, image processing may be involved in processes involving processor 104 interpreting or determining images of objects based, at least in part, on information stored in memory 108.

In some examples, an AR system or a VR system 118 may be associated with display 102f For example, VR system 118 may respond, at least in part, to objects that are touching or not touching display 102f. Virtual objects (e.g., 2D or 3D) may be rendered by display 102f, but the virtual objects need not be located in any particular place with respect to the location of display 102f. For example, display 102f may comprise head-mounted eyewear that may render a virtual object (to be perceived by the wearer to be) relatively far from the wearer of the display. In some examples, a haptic generator 120 may be associated with display 102f. For example, haptic generator 120 may generate haptic activity or virtual forces in response, at least in part, to an object that is interacting with a virtual displayed element. Generally, an object that is interacting with a virtual object may include situations where the object is virtually touching the virtual object by encountering a surface of (or being at least partially inside) a space defined by the virtual object.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a depth camera, which may be used to measure distances from the camera to various portions of an image captured by the camera. In some cases, individual pixels of the image may have associated distance data specifying the distance from the camera to the portion of the image corresponding to the respective pixel. In some examples, computing device 102 can be associated with a camera capable of capturing images and/or video and/or a microphone capable of capturing audio. For example, input/output module 106 can incorporate such a camera and/or microphone. Captured images of objects, for example, may be compared to images in a database of various objects and/or materials stored in memory 108, and such comparing may be used, in part, to identify the objects. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor 104, the computer-executable instructions configure the processor 104 to, in some examples, generate a display element and associated information regarding a space occupied by the display element, instruct the display to render (e.g., display) the display element, select a particular haptic action based, at least in part, on a position (e.g., or speed, velocity, or orientation) of the object relative to the space occupied by the display element, and drive the haptic generator to produce the particular haptic action.

In various examples, an input device of input/output (I/O) interfaces 106 can be an indirect input device (e.g., one or more mouse(mice), keyboard(s), one or more camera(s) or camera array(s), depth camera(s), etc.), and/or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., one or more mouse(mice), keyboard(s), one or more pen(s), one or more game controller(s), one or more voice input device(s), one or more touch input device(s), gestural input device(s), and the like) and/or output peripheral devices (e.g., one or more display(s), one or more printer(s), audio speakers, one or more haptic output(s), and the like).

In some implementations any of a number of computing devices 102 may be interconnected via a network 122. Such a network may include one or more data centers that store and/or process information (e.g., data) received from and/or transmitted to computing devices 102, for example.

Figure 2:
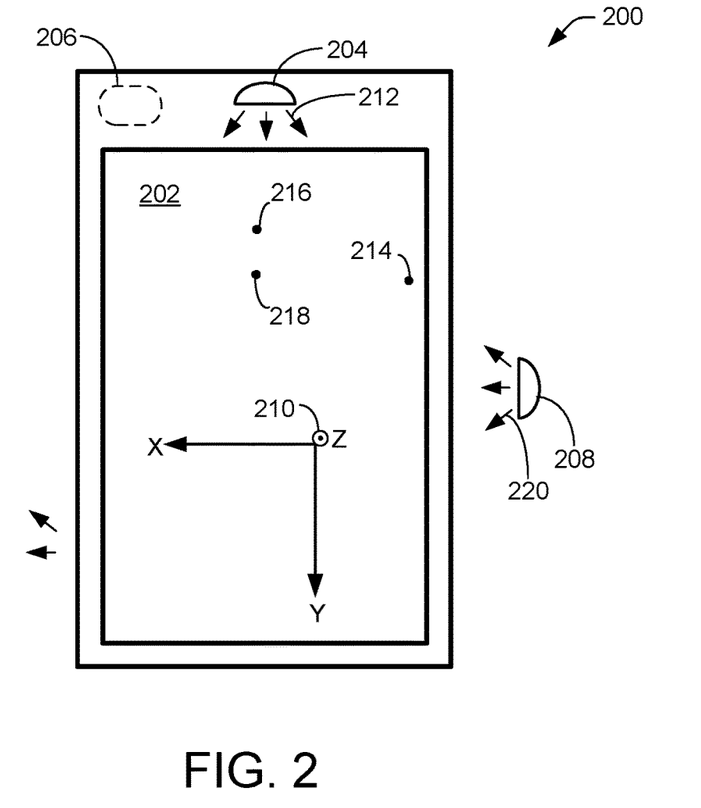
FIG. 2 is a top view of an example electronic device.

FIG. 2 is a front or top view of an example display device 200, which includes a display 202, a camera 204, and a capacitor sensor module 206. In some examples, additional one or more cameras 208 may be positioned in various locations to capture images of an object from various vantages. The cameras and/or the capacitor sensor module are associated with a few among a number of techniques that may be used to measure physical location of an object. Such location may be relative to a surface of the display device, or may be relative to a portion of an AR or VR system or other devices. For example, camera 204 and/or capacitor sensor module 206 may be used in techniques to measure or determine location and/or orientation of an object relative to a space occupied by a virtual object, as described below. For example, a capacitive sensor may generate a heat map corresponding to heights for a grid of cells that sense hover. In this way, orientation (e.g., pitch, yaw, roll) may be determined for object(s), such as fingers.

Cameras 204 and 208 may provide images to a processor, such as processor 104, for example, associated with display device 200. Such images may also (or instead) be provided to an image processor, such as image processor 114. Capacitor sensor module 206 may provide measurements of location-sensitive capacitance, responsive to an object remote from (e.g., not touching) a surface of display 202.

FIG. 2 includes an orthogonal coordinate system comprising X, Y, and Z axes, where X and Y axes describe a plane parallel with display 202, and the Z-axis is perpendicular to the display (e.g., in the direction that "protrudes" out from the figure), as indicated by a circled dot 210.

Camera 204 may be similar to or the same as a front-facing camera that may be found on any of a number of types of display devices, such as smart phones, tablets, and so on. Arrows 212 indicate the direction of view of camera 204. For example, camera 204 may be configured to capture images (or a number of images such as for a video) in a region above display 202, such as a direction substantially parallel with the X-Y plane. As further explained below, a position or location of an object in an image captured by camera 204 may be relatively easy to detect along the X-axis and the Z-axis. In other words, the position of an object may be relatively discernable in directions transverse to the direction of view (e.g., the Y-axis) of camera 204. On the other hand, a position or location of an object in an image captured by camera 204 may be relatively difficult to detect along the Y-axis. Thus, for example, the location difference between an object at point 214 and the object at point 216 may be relatively easy to detect in an image captured, since the location difference is substantial along a direction (X-axis) transverse to the direction (Y-axis) of view of camera 204. In contrast, the location difference between the object at point 216 and the object at point 218 may be relatively difficult to detect in an image captured, since the location difference is substantial along a direction (Y-axis) parallel to the direction (Y-axis) of view of camera 204. Thus, camera 208, facing a direction indicated by arrows 220, may be used to detect a position or location of an object along the Y and/or Z-axes. Of course, such details of cameras and their relative locations are merely examples, and claimed subject matter is not so limited.

Figure 3:
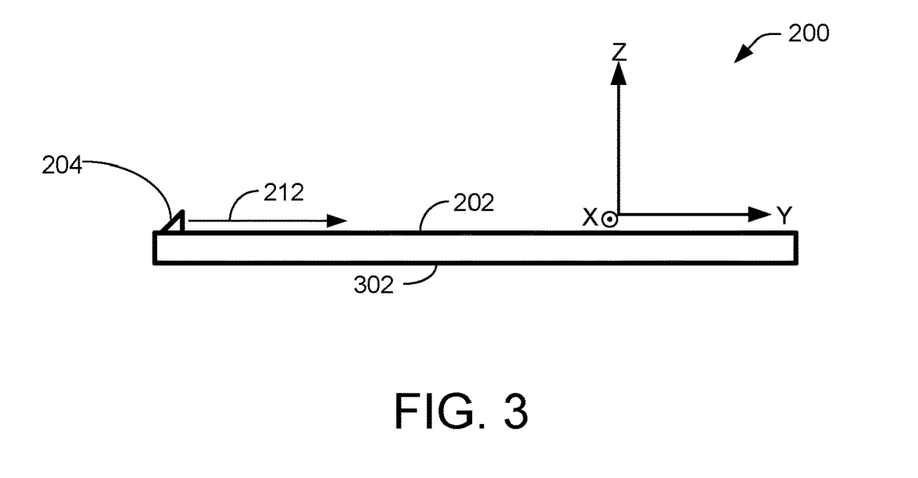
FIG. 3 is a side view of an example electronic display device.

FIG. 3 is a side view of the example display device 200 described above for FIG. 2. The side view illustrates the back 302 of display device 200. Camera 204 may protrude from the front surface of the display device 200 so as to have a view 212 of the region above display 202. In some configurations, camera 204 may comprise a pop-up option, where camera 204 may be able to rotate to a protruding orientation (e.g., as illustrated) or to an orientation that is flush with the surface of display device 200, for example.

Figure 4:
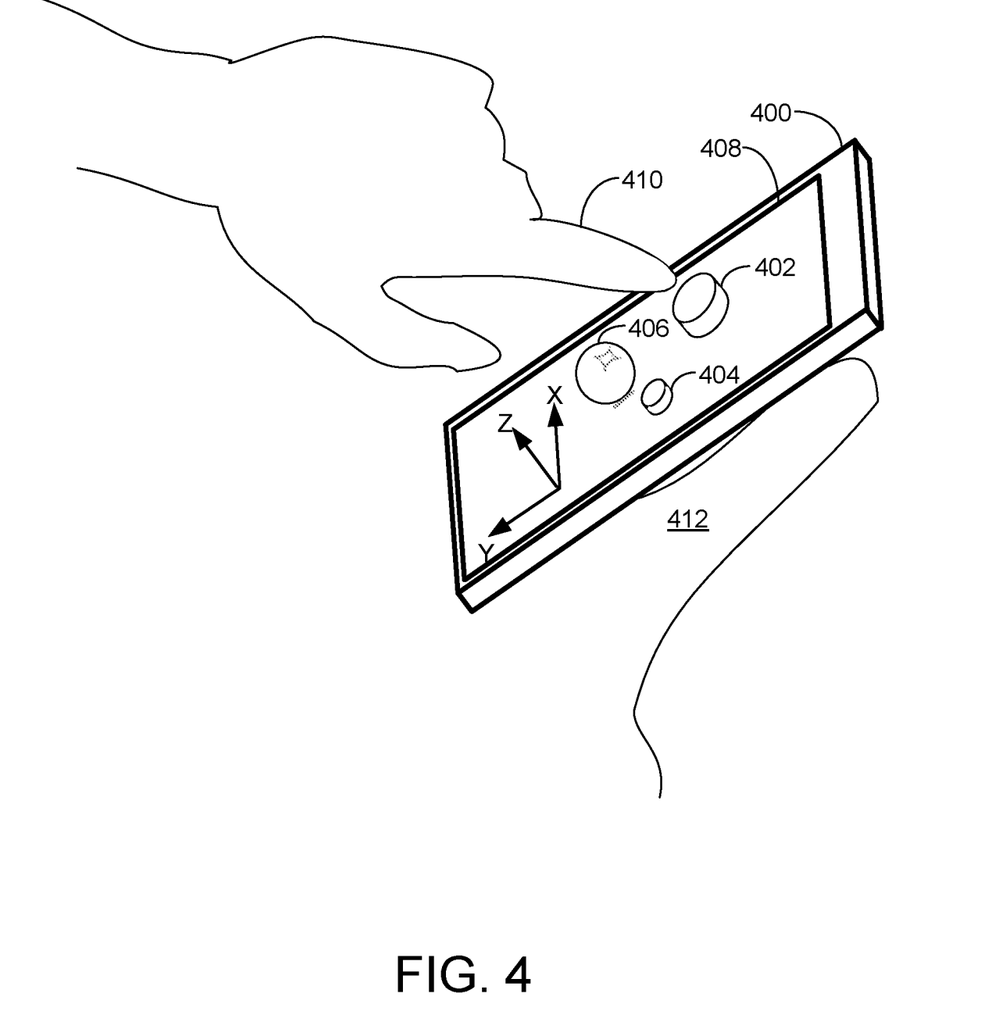
FIG. 4 is a perspective view of an example electronic device displaying 3D display elements.

FIG. 4 is a perspective view of an example electronic device 400 displaying virtual display elements. Display axes X, Y, and Z are illustrated and correspond to those of FIGS. 2 and 3. Virtual display elements may include any of a number of shapes or sizes. For example, virtual display elements 402 and 404 comprise cylindrically-shaped volumes of differing sizes, and virtual display element 406 comprises a spherically-shaped volume. In some examples, virtual display elements may be rendered by a portion of a system which need not include electronic device 400. For example, an AR or VR system may include eyewear that renders virtual display elements to the wearer so that the virtual display elements may appear to be located at any locations, including locations just above, below, on the side, or on electronic display 400 (e.g., even though electronic display 400 is not the entity that rendered the virtual display elements). In other examples, virtual display elements may be rendered by a display 408 of electronic device 400. For example, a person observing display 408 may be wearing a particular type of eyewear that creates an optical effect where elements displayed by display 408 appear to protrude outward from the display. In other examples, eyewear is not needed.

FIG. 4 depicts an object 410 (in this case a finger) that is approaching virtual display element 402. In detail, object 410 is a real object that is approaching a virtual display element (relatively speaking: the virtual display element may be approaching the object, or the virtual display element and the object may be approaching each other) that is virtually occupying a volume of space. Such space may be defined by an AR or VR system. Using any of a number of techniques, as described above for FIG. 2, for example, a system may detect the position of object 410 relative to the virtual location that the system is rendering for the virtual display element. In this way, the system can detect if object 410 has or is virtually touching virtual display element 402. Moreover, as explained below, the system can detect if object 410 is virtually inside (the volume of) virtual display element 402, and if so, by how much.

In some examples, electronic device 400 may be a handheld device that is held by a hand 412 of a user, though claimed subject matter is not limited in this respect. As described below, in some examples, electronic device 400 may include one or more haptic transducers that can impart any of a number of types of haptic actions to hand 412.

Figure 5:
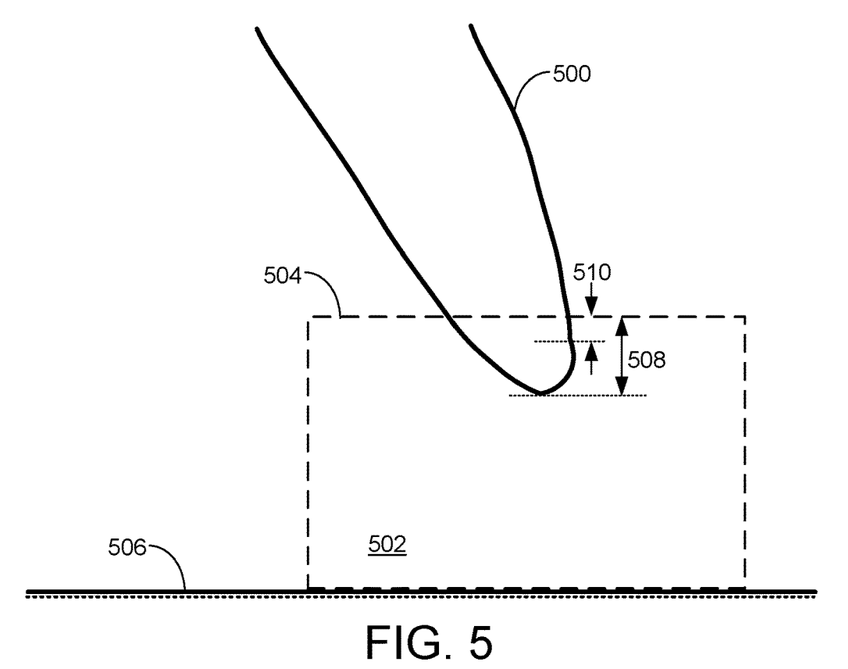
FIG. 5 is a close-up side view of an object interacting with space defined by an example 3D display element.

FIG. 5 is a close-up side view of an object 500 interacting with space 502 defined by an example virtual display element 504. Though virtual display element 504 may be virtually located at any of a number of locations, it is illustrated as being located adjacent to a surface 506. In some examples, a system may impart haptic action to surface 506, which may be held by a hand of a user (e.g., 412). Such haptic action may be responsive to particular types of interactions between object 500 and virtual display element 504. As depicted, object 500 is partly inside virtual display element 504 so that a distal portion of object 500 is a distance 508 inside virtual display element 504. In some examples, the system may produce haptic actions having particular characteristics depending on whether object 500 is (i) approaching a surface of virtual display element 504, (ii) touching (but not beyond) a surface of virtual display element 504, (iii) inside virtual display element 504 by one particular amount, or (iv) inside virtual display element 504 by another particular amount. Such haptic action characteristics may include vibration frequency, intensity, pulsations, and duration, just to name a few examples. For example, a haptic action responsive to object 500 just touching the surface of virtual display element 504 may be a haptic action having a particular intensity. In some implementations, haptic action characteristics may be such that a user may feel a sensation of texture (e.g., haptic frequency being relatively large). As object 500 further penetrates the virtual space of virtual display element 504, the haptic action may increase in intensity, corresponding with an increase of space penetration. In some cases, virtual hardness may be rendered by haptic generators by being responsive to an amount by which an object penetrates a virtual display element, as described above. For example, intensity of a haptic action for object 500 penetrating virtual display element 504 by a distance 508 may be greater compared to a haptic action for object 500 penetrating virtual display element 504 by a lesser distance 510. Such an intensity (and/or frequency) difference may provide a person receiving the haptic action a sense of texture or hardness of virtual display element 504. In some examples, such an intensity difference may provide a person receiving the haptic action information or sensation that might be useful for correcting the trajectory of object 500.

Figure 6:
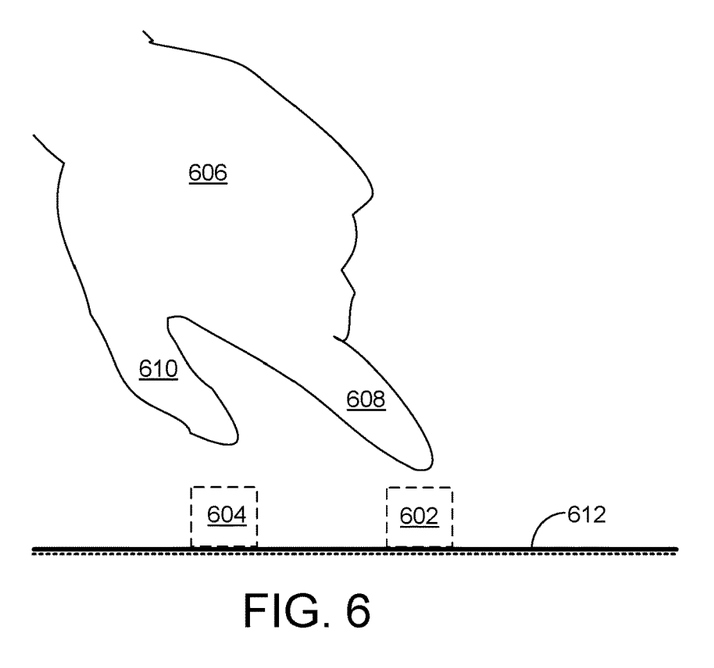
FIG. 6 is a side view of an object interacting with spaces defined by multiple example 3D display elements.

FIG. 6 is a side view of an object interacting with spaces defined by multiple example virtual display elements 602 and 604. In the particular example illustrated, a hand 606 of a user may include a first finger 608 and a second finger 610 (herein, a thumb is referred to as a finger, unless otherwise specified) that may interact with the virtual display elements. Though virtual display elements 602 and 604 may be virtually located at any of a number of locations and have any sizes, orientations, or shapes, they are illustrated as being located adjacent to a surface 612 of a device. In some examples, a system may impart haptic action to the device, which may be held by the other hand (e.g., the hand opposite hand 606) of a user. Such haptic action may be responsive to particular types of interactions between or among first finger 608, second finger 610, display element 602, and display element 604.

In some examples, the system may produce haptic actions having particular characteristics depending on whether first finger 608 or second finger 610 is (i) touching (but not beyond) a surface of virtual display element 602 or 604, (ii) inside virtual display element 602 or 604 by one particular amount, or (iii) inside virtual display element 602 or 604 by another particular amount. Such haptic action characteristics may include vibration frequency, intensity, pulsations, and duration, just to name a few examples. For example, a haptic action responsive to finger 610 just touching the surface of virtual display element 604 may be a haptic action having a particular intensity. A haptic action responsive to the same finger 610 just touching the surface of virtual display element 602 may be a haptic action having a different particular intensity. Such differences in haptic action for different display elements may allow the user to perceive differences in characteristics between the display elements. For example, the system may portray to the user, via haptic actions, characteristics such as texture, hardness, location, and type of the display elements. For instance, the system may portray display element 602 as comprising a more resilient (virtual) material as compared to display element 604 by generating a haptic action for interaction with display element 602 that has a greater intensity as compared to haptic action for interaction with display element 604.

In some examples, the system may alter a display element in response to an interaction with an object. Altering the display element may include vibrating (e.g., wiggling) the image of the display element, changing its color or texture, and annotating the display element, just to name a few examples. In one instance, the system may wiggle virtual display elements (e.g., 602 and/or 604) if the user is 'touching' these elements with object 608 and/or 610. The user, while holding device 400, may feel a haptic sensation that may be similar to a feeling of holding a flat piece of wood (or other material) with springs as a touch of the springs makes them wiggle, for example. Altering a display element may provide feedback to a user that the user (e.g., an object thereof) has or is interacting with the display element. For example, the system may vibrate or shake the appearance of display element 602 in response to either of finger 608 or 610 touching the display element. Such vibrating or shaking may appear, in some instances, to be vibrating in synchronization with the vibration frequency of the haptic feedback. Meanwhile, the appearance of other display elements, being untouched, may remain unchanged. In another example, the system may change (e.g., permanently or temporarily) the color of the touched displayed element. Among multiple display elements, each may have different amounts of vibration or shaking depending, at least in part, on particular circumstances regarding locations of objects (e.g., fingers 608, 610) relative to the respective display elements.

Figure 7:
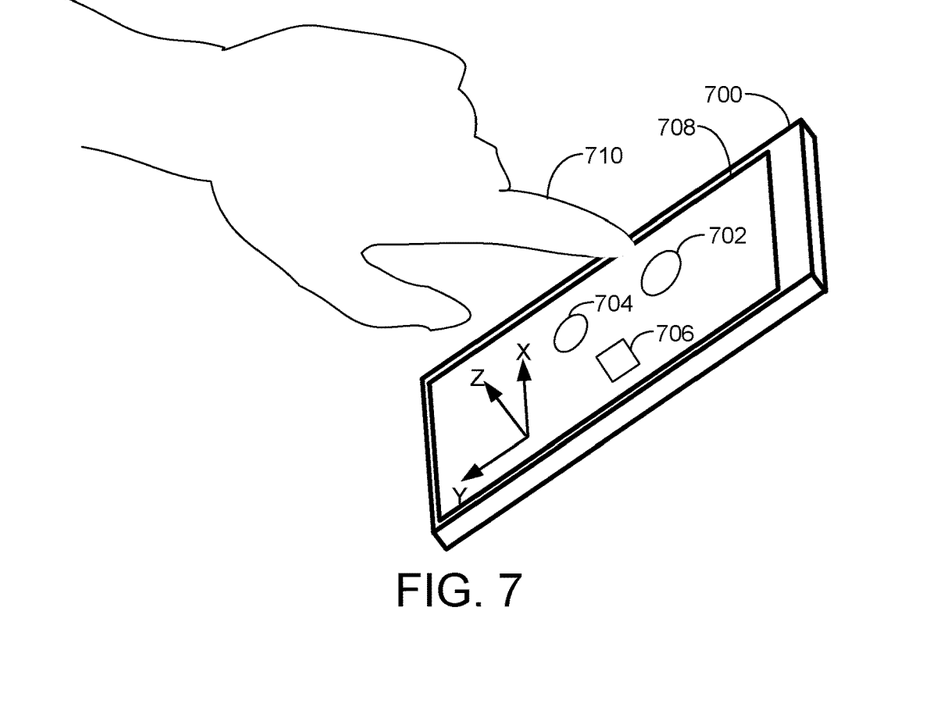
FIG. 7 is a perspective view of an example electronic device displaying 2D display elements.

FIG. 7 is a perspective view of an example electronic device 700 displaying 2D display elements. Display axes X, Y, and Z are illustrated and correspond to those of FIGS. 2 and 3. 2D display elements may include any of a number of shapes or sizes. For example, 2D display elements 702 and 704 comprise circles of differing sizes, and 2D display element 706 comprises a square. In some examples, 2D display elements may be rendered by a portion of a system which need not include electronic device 700. For example, an AR or VR system may include eyewear that renders 2D display elements to the wearer so that the 2D display elements may appear to be located at any locations, including locations just above or on electronic display 400 (e.g., even though electronic display 400 is not the entity that rendered the 2D display elements). In other examples, 2D display elements may be rendered by a display 708 of electronic device 700. For example, a person observing display 708 may be wearing a particular type of eyewear that creates an optical effect where elements displayed by display 708 appear to float or protrude outward from the display (e.g., 2D objects that become 3D objects by a user wearing 3D glasses). In another example, 2D display elements may be rendered by a display 708 as a perspective view, to portray three dimensions. In still other examples, 2D display elements may include associated information regarding a space occupied by the display element. For instance, the 2D display element may be associated with data that specifies or defines a virtual height by which the 2D display object extends above display 708. In this case, such data may be stored in a memory (e.g., 108) with data that defines the corresponding 2D display elements.

FIG. 7 depicts an object 710 (in this case a finger) that is approaching 2D display element 702. In an example, object 710 is a real object that is approaching a display element that is virtually occupying a volume of space defined by the area of the display element and associated information that specifies virtual height or extension above display 708. Using any of a number of techniques, as described above for FIG. 2, for example, a system may detect the position of object 710 relative to the virtual height that the system is rendering for the 2D display element. In this way, the system can detect if object 710 has or is virtually touching 2D display element 702. Moreover, the system can detect if object 710 is below the virtual height of the display element 702, and if so, by how much.

In some examples, electronic device 700 may be a handheld device that is held by a hand of a user, though claimed subject matter is not limited in this respect. In some examples, electronic device 700 may include one or more haptic transducers that can impart any of a number of types of haptic actions to the hand.

Figure 8:
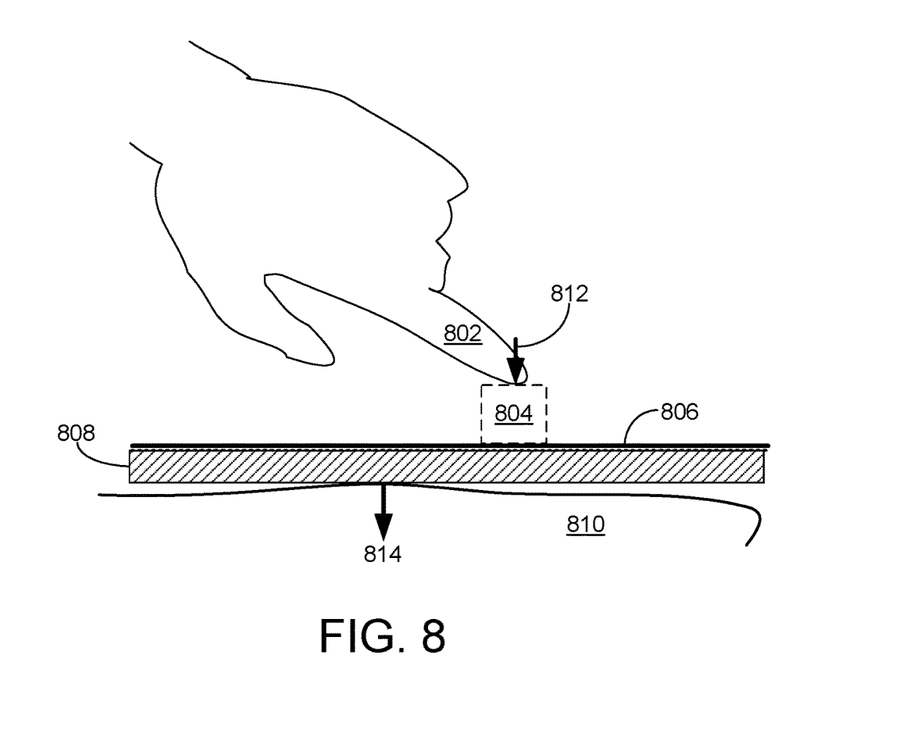
FIG. 8 is a side view of an object interacting with a space defined by an example 3D display element.

FIG. 8 is a side view of an object 802 interacting with a space (depicted by the dashed lines) defined by an example virtual (e.g., 2D or 3D) display element 804. Though display element 804 may be virtually located at any of a number of locations, it is illustrated as being located adjacent to a surface 806 of a haptic device 808. Herein, a haptic device is an electronic device that includes one or more transducers capable of generating haptic actions or virtual forces. A handheld device or Smartphone, for example, may be a haptic device.

In some examples, a system may impart a virtual force, via haptic device 808, onto a hand 810 of a user. Such a virtual force may be responsive to particular types of interactions between object 802 and virtual display element 804. A virtual force may be produced by a mechanism that induces the virtual force based on human illusory sensations. For example, an asymmetric signal may be applied to a tactile actuator comprising an electromagnetic coil, a metal weight, and a spring, so that a user feels that the device is being pulled (or pushed) in a particular direction, although the device is not supported by any mechanical connection to other objects or the ground. Such a tactile device may have a small form factor that allows the device to be implemented in electronic devices such as handheld displays, Smartphones, AR or VR systems, and so on.

In some examples, a virtual force may be generated by a structure having electromagnet coils attached to a metal sheet supported by a spring. The metal sheet may be placed between two permanent magnets. When a wave signal is transmitted to the electromagnet coils, the metal sheet vibrates in response. After the signal stops, the vibration may be suspended by the spring and the magnets within a relatively short period, such as 50 milliseconds, for example. The short suspension time contributes to accuracy and crispness of a tactile sensation. While such a structure may be effective as a tactile device, normally it does not create a net force. However, an asymmetric signal transmitted to the electromagnet coils may cause a virtual force such that the user feels as if an invisible force is pulling the device in a particular direction, or pushing the device in the opposite direction. In this case, the signal may be applied to the electromagnet coils for a short period (e.g., 2 milliseconds) to move the mass in one direction, and is then suspended. When the mass returns to the original position (which may take around 6 milliseconds), the signal may be applied to the electromagnet coils again, and the process is repeated. As a result, the movement of the mass becomes asymmetric (e.g., the movement caused by the electromagnet coils is fast, and the movement caused by the spring is slow). Various asymmetric signal patterns may create a virtual force in two opposite directions. A user generally feels such a virtual force because of the non-linearity of human force perception: the difference in the accelerations in the movement of the mass caused by the electromagnetic coils and by the spring is not offset. Thus, the user may feel a (virtual) force in one direction. By changing the duty ratio of the signal, the user may also feel a force in the opposite direction. In one example, a virtual force may be produced using a 2 millisecond on and an 8 millisecond off cycle. Since there is no mechanical component that connects the device to the ground or other solid mass, there is no actual force as perceived. Instead, there is a sensory illusion of force that the user perceives. Of course, there may be other techniques for producing a virtual force, and claimed subject matter is not limited to the examples described above.

As depicted, object 802 is virtually touching virtual display element 804 with a motion that may be considered to be pushing (as indicated by arrow 812) on virtual display element 804. In some examples, the system may produce a virtual force 814 (e.g., "pushback") having a location(s) and particular characteristics depending on whether object 802 is (i) touching (but not beyond) a surface of display element 804, (ii) inside display element 804 by one particular amount, or (iii) inside display element 804 by another particular amount. Virtual force 814 may be imparted to a hand or other portion of a user via one or more areas of contact with haptic device 808. Such virtual force characteristics may include intensity, pulsations, and duration, just to name a few examples. For example, a virtual force responsive to object 802 just touching the surface of display element 804 may be a virtual force 814 having a particular intensity. As object 802 further penetrates the virtual space of display element 804, the virtual force may increase in intensity, corresponding with an increase of space penetration. In some cases, virtual hardness may be portrayed by the virtual force being responsive to an amount by which an object penetrates a virtual display element. For example, intensity of virtual force 814 for object 802 penetrating display element 804 by a particular distance may be greater compared to virtual force 814 for object 802 penetrating display element 804 by a lesser distance. Such an intensity difference may provide a person receiving the virtual force a sense of texture or hardness of display element 804. In some examples, virtual force 814 may depend, at least in part, on speed/velocity and/or trajectory of object 802 (e.g., a quick tap on display element 804 in contrast to pushing on display element 804)

Figure 9:
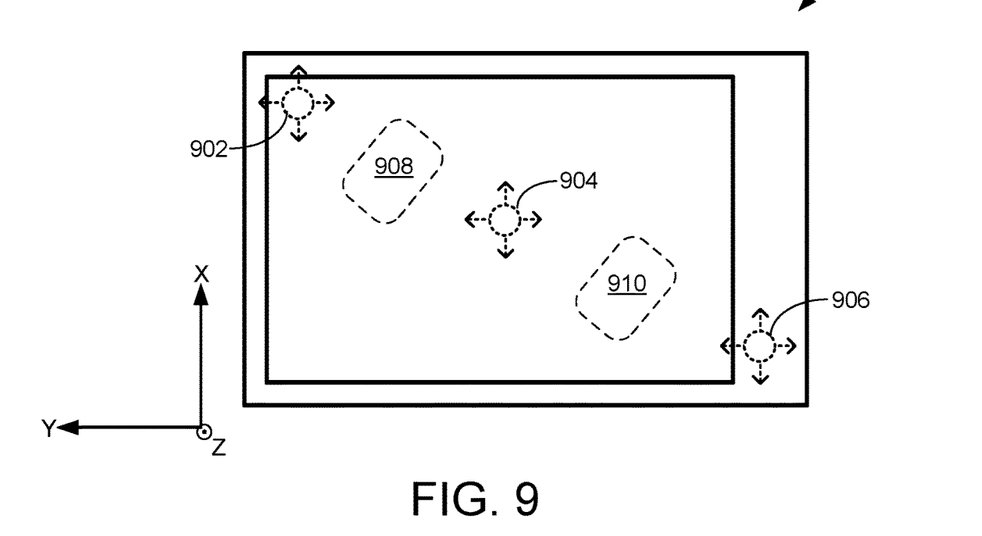
FIG. 9 is a top view of an example haptic device.

FIG. 9 is a top view of an example haptic device 900. Display axes X, Y, and Z are illustrated and correspond to those of FIGS. 2 and 3. As mentioned above, a haptic device is an electronic device that includes one or more transducers capable of generatoinghaptic actions or virtual forces. For example, haptic device 900 includes transducers 902, 904, and 906. In some examples, combinations of the transducers may be operated, located, and/or configured to impart haptic actions or virtual forces in selected target portions of haptic device 900. For example, by activating transducers 902 and 904 (e.g., maintaining transducer 906 in an "off" state), a haptic action or virtual force may be imparted, and perceived by a user holding or otherwise in contact with haptic device 900, at portion 908. Similarly, by activating transducers 904 and 906 (e.g., maintaining transducer 902 in an "off" state), a haptic action or virtual force may be imparted at portion 910. Additional transducers at additional locations may allow for greater control of a haptic action or virtual force location. Claimed subject matter is not limited in this respect.

In some examples, combinations of the transducers may be operated, located, and/or configured to impart haptic actions or virtual forces that move in selected directions along haptic device 900. For example, by activating transducers 902 and 904 in a time-dependent fashion (e.g., intensity of transducer 902 may be increasing as intensity of transducer 904 is decreasing), a haptic action or virtual force may move across (or through) haptic device 900, and perceived by a user holding or otherwise in contact with haptic device 900 at changing locations. Additional transducers at additional locations may allow for greater control of motion of haptic actions or virtual forces. Claimed subject matter is not limited in this respect.

Figure 10:
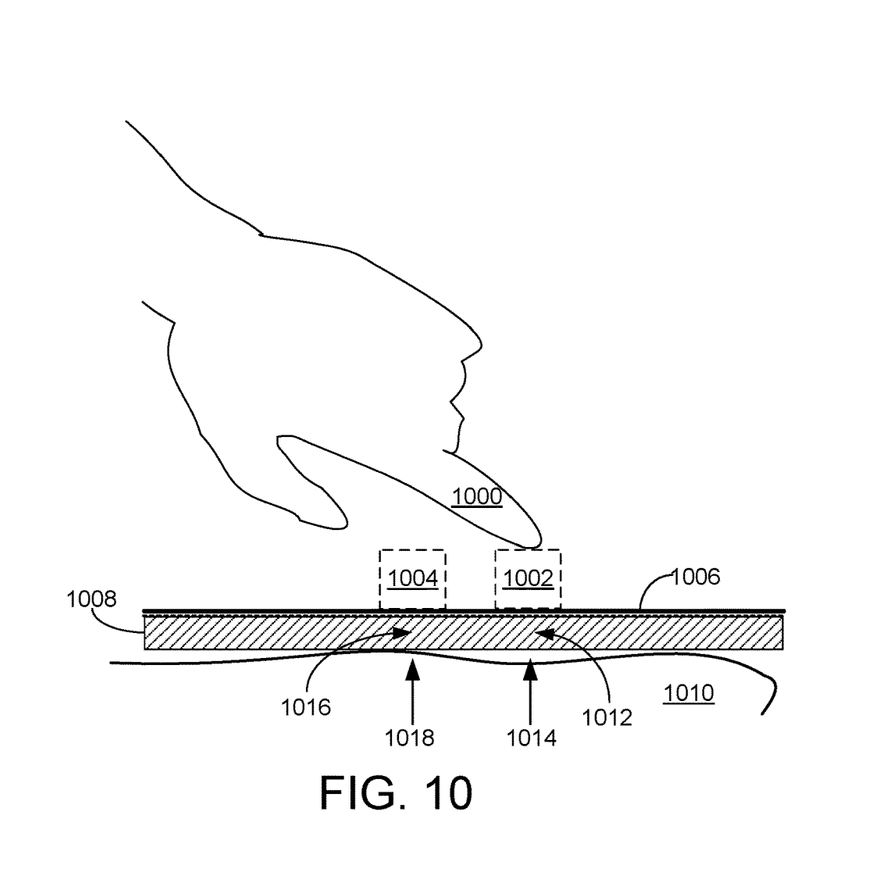
FIG. 10 is a side view of an object interacting with spaces defined by multiple example 3D display elements.

FIG. 10 is a side view of an object 1000 interacting with spaces defined by multiple example virtual display elements 1002 and 1004. Though virtual display elements 1002 and 1004 may be virtually located at any of a number of locations, they are illustrated as being located adjacent to a surface 1006 of a haptic device 1008. In some examples, a system may impart haptic action or virtual forces to particular targeted (e.g., selected) portions of haptic device 1008, which may be held by a hand 1010 of a user. Locations of such haptic action or virtual forces may be selected based, at least in part, on locations of interactions between object 1000 and virtual display elements 1002 and 1004. For example, an interaction between object 1000 and virtual display element 1002 in a region 1012 may result in a haptic action or virtual force 1014 at or near region 1012. Similarly, an interaction between object 1000 and virtual display element 1004 in a region 1016 may result in a haptic action or virtual force 1018 at or near region 1016. Moreover, as described above, haptic action or virtual forces 1014 and 1018 may move (e.g., change direction and/or intensity) from one region to another region. Such movement may be based, at least in part, on movement of interactions between object 1000 and the virtual display elements.

As described above, a virtual force may be produced by a mechanism that induces the virtual force based on human illusory sensations. Accordingly, by selecting particular locations of haptic actions or virtual forces, a system may allow a user to feel an effect that portrays haptic device 1008 being pulled (or pushed) in a particular direction responsive to the location and direction that the user is interacting with virtual display elements 1002 and 1004. Haptic actions or virtual forces may be imparted to hand 1010 or other portion of the user via one or more areas of contact with haptic device 1008. In some implementations, haptic feedback may be provided without a need for the user to contact any device, such as in the case where a jet of air is directed to the user, for example.

Figure 11:
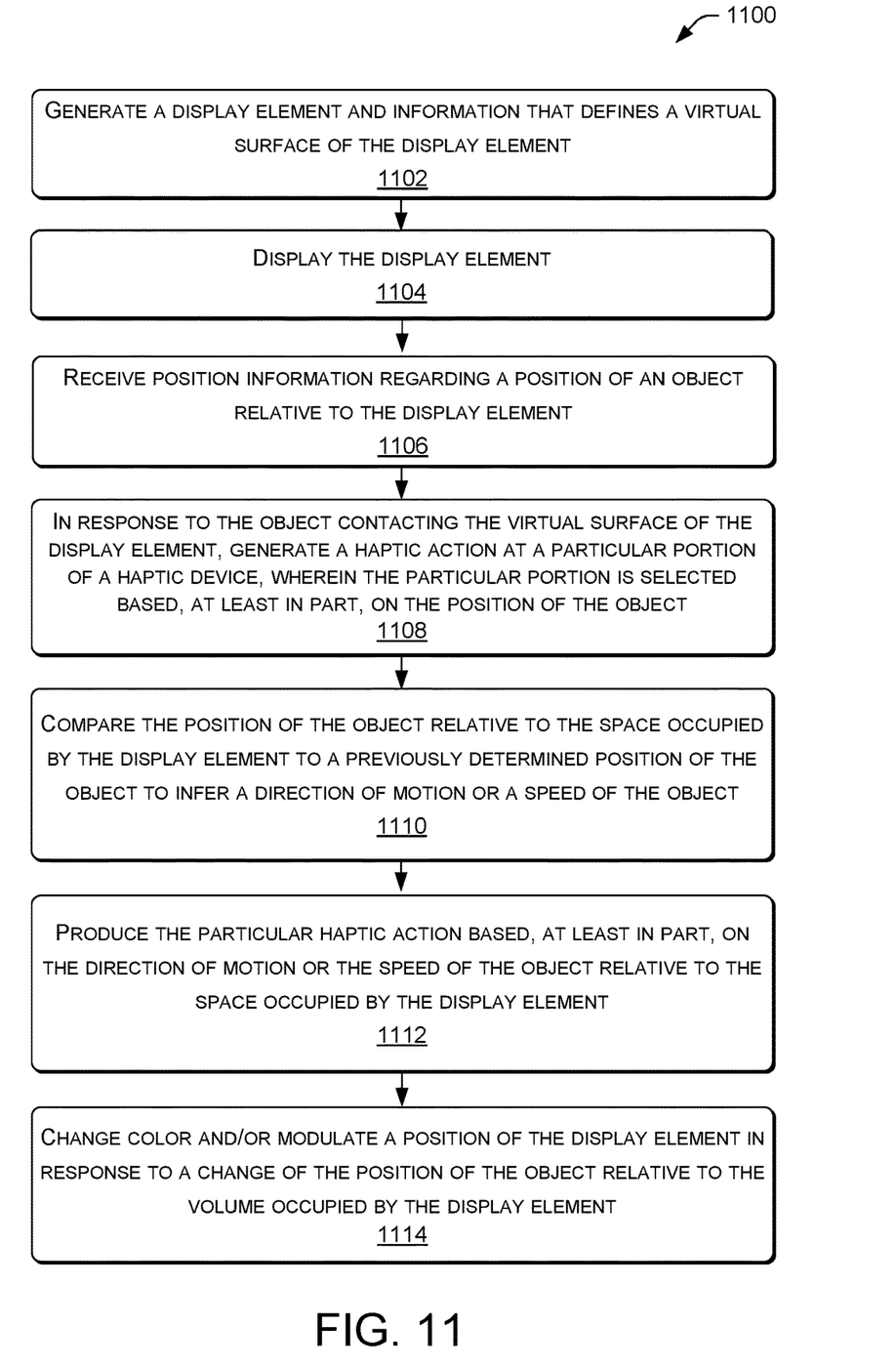
FIGS. 11 and 12 are flow diagrams of example processes for producing haptic feedback in response to a user interacting with space defined by a 3D display element.

FIG. 11 is a flow diagram of an example process 1100 for producing haptic feedback in response to a user interacting with space defined by a virtual display element. Process 1100 may be performed by a processor, for example. For example, process 1100 may be performed by computing device 102, illustrated in FIG. 1. At block 1102, the processor may generate a display element and information that defines a virtual surface of the display element. At block 1104, the processor may display the display element. At block 1106, the processor may receive position information regarding a position of an object relative to the display element. At block 1108, the processor may, in response to the object contacting the virtual surface of the display element, generate a haptic action at a particular portion of a haptic device, wherein the particular portion is selected based, at least in part, on the position of the object. At block 1110, the processor may compare the position of the object relative to the space occupied by the display element to a previously determined position of the object to infer a new position, direction of motion, or a speed of the object. At block 1112, the processor may produce the particular haptic action based, at least in part, on the direction of motion or the speed of the object relative to the space occupied by the display element. At block 1114, the processor may change color and/or modulate a position of the display element in response to a change of the position of the object relative to the volume occupied by the display element. In some implementations, the processor may change the display element so that the display element appears to deform, break apart, or other visual or acoustic augmentation in response to the object touching the display element.

Figure 12:
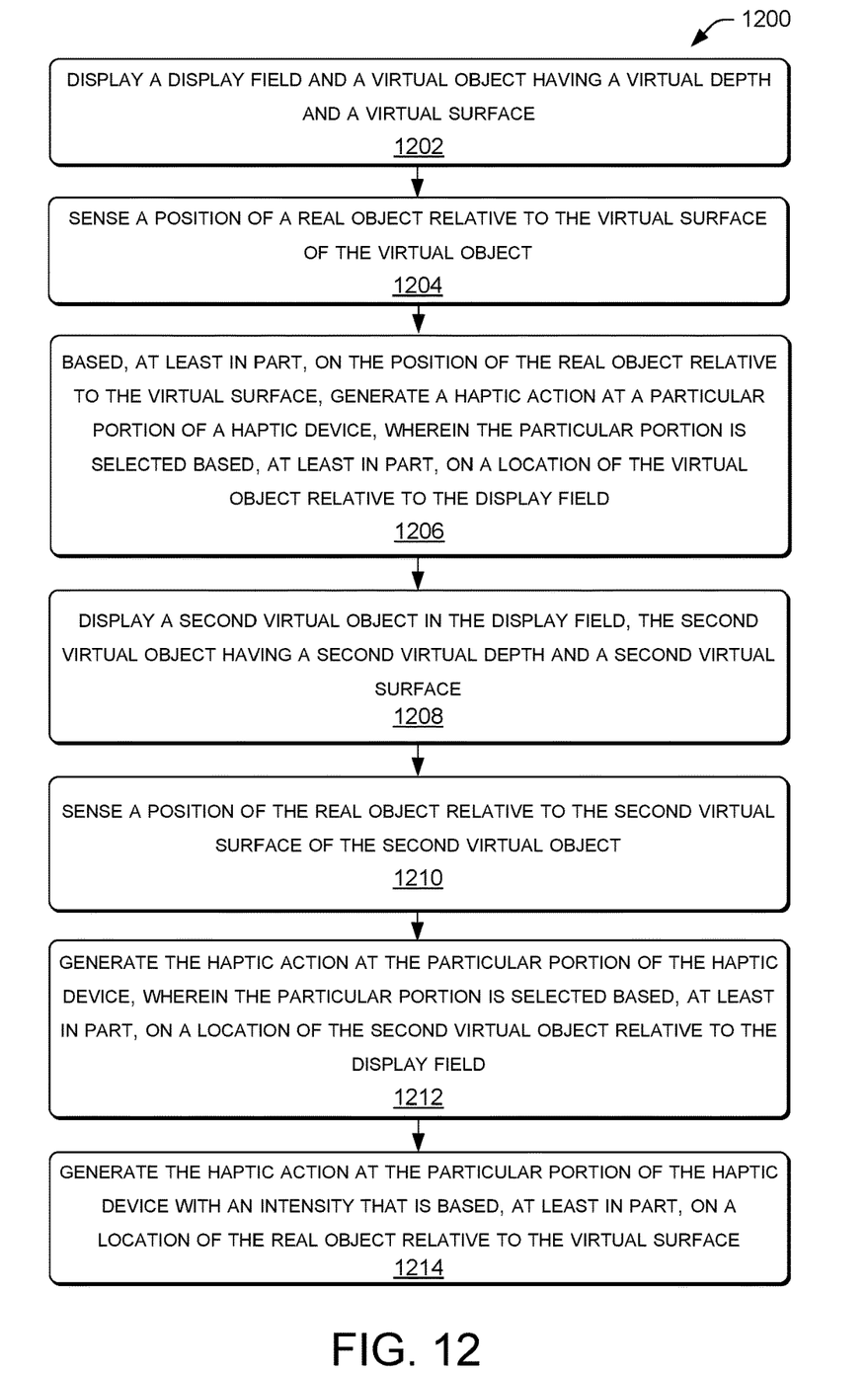

FIG. 12 is a flow diagram of an example process 1200 for producing haptic feedback in response to a user interacting with space defined by a virtual display element. Process 1200 may be performed by a processor, for example. For example, process 1200 may be performed by computing device 102, illustrated in FIG. 1. At block 1202, the processor may display a display field and a virtual object having a virtual depth (or shape) and a virtual surface. At block 1204, the processor may sense a position of a real object relative to the virtual surface of the virtual object. At block 1206, the processor may, based at least in part on the position of the real object relative to the virtual surface, generate a haptic action at a particular portion of a haptic device, wherein the particular portion is selected based, at least in part, on a location of the virtual object relative to the display field. At block 1208, the processor may display a second virtual object in the display field, the second virtual object having a second virtual depth and a second virtual surface. At block 1210, the processor may sense a position of the real object relative to the second virtual surface of the second virtual object. At block 1212, the processor may generate the haptic action at the particular portion of the haptic device, wherein the particular portion is selected based, at least in part, on a location of the second virtual object relative to the display field. At block 1214, the processor may generate the haptic action at the particular portion of the haptic device with an intensity that is based, at least in part, on a location of the real object relative to the virtual surface.

The flow of operations illustrated in FIGS. 11 and 12 are illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIGS. 11 and 12 may represent modules, segments, or portions of code that include one or more executable instructions for implementing specific logical functions or elements in the routine.

Example Clauses

A. A system comprising: a display operable by one or more processors; a position sensor configured to sense position of an object in three-dimensional (3D) space; a haptic generator configured to produce haptic action; and a memory storing instructions that, when executed by the one or more processors, cause the one or more processors to perform operations comprising: generating a display element and/or associated information regarding a space occupied by the display element; instructing the display to render the display element; selecting a particular haptic action based, at least in part, on a position of the object relative to the space occupied by the display element; and prompting the haptic generator to produce the particular haptic action.

B. The system as paragraph A recites, wherein the display element comprises a 3D display element and a space occupied by the 3D display element comprises a virtual space.

C. The system as paragraph A recites, wherein the display element comprises a 2D display element and the space occupied by the 2D display element comprises an area on the display and a virtual shape, wherein the information regarding the space occupied by the display element includes the virtual shape.

D. The system as paragraph A recites, wherein the display comprises a head-mounted virtual display device.

E. The system as paragraph A recites, wherein the particular haptic action comprises a haptic action at a particular location relative to the display, wherein the particular location is based, at least in part, on a virtual position of the space occupied by the display element.

F. The system as paragraph A recites, wherein the object comprises a first virtual object and the display element comprises a second virtual object, and further comprising:
prompting the haptic generator to produce the particular haptic action based, at least in part, on the relative positions of the first virtual object and the second virtual object.

G. The system as paragraph A recites, wherein the haptic generator comprises two or more haptic transducers disposed in localized regions of the display to produce the particular haptic action at a particular location relative to the display by adjusting relative amounts of haptic action of the two or more haptic transducers.

H. The system as paragraph A recites, wherein the haptic generator and the display are collocated in a handheld device.

I. The system as paragraph A recites, wherein the object that the position sensor is configured to sense comprises a finger of a user or a stylus.

J. The system as paragraph A recites, wherein the information regarding a space occupied by the display element further includes information regarding a virtual hardness of the display element, and the operations further comprise: producing the particular haptic action based, at least in part, on the virtual hardness of the display element.

K. The system as paragraph A recites, wherein operations further comprise:
comparing the position of the object relative to the space occupied by the display element to a previously determined position of the object to infer a direction of motion or a speed of the object; and producing the particular haptic action based, at least in part, on the direction of motion or the speed of the object relative to the space occupied by the display element.

L. The system as paragraph A recites, wherein operations further comprise:
changing color and/or modulating a position of the display element in response to a change of the position of the object relative to the location of the volume occupied by the display element.

M. A method comprising: displaying a display field and a virtual object having a virtual shape and a virtual surface; sensing a position of a real object relative to the virtual surface of the virtual object; and based, at least in part, on the position of the real object relative to the virtual surface, generating a haptic action at a particular portion of a haptic device, wherein the particular portion is selected based, at least in part, on a location of the virtual object relative to the display field.

N. The method as paragraph M recites, further comprising: displaying a second virtual object in the display field, the second virtual object having a second virtual depth and a second virtual surface; sensing a position of the real object relative to the second virtual surface of the second virtual object; and generating the haptic action at the particular portion of the haptic device, wherein the particular portion is selected based, at least in part, on a location of the second virtual object relative to the display field.

O. The method as paragraph M recites, further comprising: generating the haptic action at the particular portion of the haptic device with an intensity that is based, at least in part, on a location of the real object relative to the virtual surface.

P. The method as paragraph M recites, wherein the haptic action comprises a moving haptic action that moves from one portion of the haptic device to another portion of the haptic device in response to sensing movement of the position of the real object relative to the virtual surface of the virtual object.

Q. One or more computer-readable media storing computer-executable instructions that, when executed on one or more processors, configure a computer to perform acts comprising: generating a display element and information that defines a virtual surface of the display element; displaying the display element; receiving position information regarding a position of an object relative to the display element; and in response to the object contacting the virtual surface of the display element, generating a haptic action at a particular portion of a haptic device, wherein the particular portion is selected based, at least in part, on the position of the object relative to the display element.

R. The computer-readable media as paragraph Q recites, wherein the acts further comprise: producing a particular type of haptic action at the particular location by adjusting relative amounts of haptic generation of two or more haptic transducers located in the haptic device.

S. The computer-readable media as paragraph Q recites, wherein the display element comprises a perspective two-dimensional display element.

T. The computer-readable media as paragraph Q recites, wherein the information that defines the virtual surface of the display element further includes information regarding a hardness of the display element, and wherein the acts further comprise: producing a particular type of haptic action based, at least in part, on the hardness of the display element.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium and/or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
    a display operable by one or more processors;
    a position sensor configured to sense a position of an object in a three-dimensional (3D) environment;
    a haptic generator configured to produce one or more haptic actions; and
    a memory storing instructions that, upon execution by the one or more processors, cause the one or more processors to perform operations comprising:
        generating, in the memory, a representation of a display element;
        rendering, on the display, a virtual representation of the display element in a 3D space that includes a virtual hardness of the display element that corresponds to responsiveness of the display element to penetration by the object;
        selecting a first haptic action based, at least in part, on the position of the object relative to a space occupied by the virtual representation of the display element in the 3D space; and
        prompting the haptic generator to produce the first haptic action at least in part based on the virtual hardness of the display element.

2. The system of claim 1, wherein the display element comprises a 3D display element and a space occupied by the 3D display element comprises a virtual space within the 3D space.

3. The system of claim 1, wherein the display element comprises a two-dimensional (2D) display element and the space occupied by the 2D display element comprises an area on the display and a shape, wherein the representation of the space, on the display, to be occupied by the display element includes the shape.

4. The system of claim 1, wherein the display comprises a head-mounted virtual display device.

5. The system of claim 1, wherein the first haptic action is carried out at a first location relative to the display, wherein the first location is based, at least in part, on an area occupied by the display element.

6. The system of claim 1, wherein the object comprises a first virtual object and the display element comprises a second virtual object, and further comprising:
    prompting the haptic generator to produce the first haptic action based, at least in part, on the relative locations of the first virtual object and the second virtual object.

7. The system of claim 1, wherein the haptic generator comprises two or more haptic transducers disposed in regions of the display to produce the first haptic action at a first location relative to the display by adjusting relative amounts of haptic activity of the two or more haptic transducers.

8. The system of claim 1, wherein the haptic generator and the display are collocated in a handheld device.

9. The system of claim 1, wherein the object that the position sensor is configured to sense comprises a finger or a stylus.

10. The system of claim 1, the operations further comprising:
    comparing the position of the object relative to the space occupied by the display element to a previously determined position of the object to infer a velocity of the object; and
    producing the first haptic action based, at least in part, on the velocity of the object relative to the space occupied by the display element.

11. The system of claim 1, the operations further comprising:
    changing a color of the space occupied by the display element or moving the space occupied by the display element in response to a change of the position of the object.

* * * * *